US009816896B2

United States Patent
Meaney et al.

(10) Patent No.: US 9,816,896 B2
(45) Date of Patent: Nov. 14, 2017

(54) BEARING ARRANGEMENT HAVING A SENSOR ROLLING ELEMENT

(71) Applicants: Paul Meaney, Schwarzach-am-Main (DE); Nicolaas Simon Willem Den Haak, Zwijndrecht (NL); Matthias Hofmann, Schweinfurt (DE); Baozhu Liang, Dittelbrunn-Hambach (DE); Hans-Juergen Liesegang, Schortens (DE)

(72) Inventors: Paul Meaney, Schwarzach-am-Main (DE); Nicolaas Simon Willem Den Haak, Zwijndrecht (NL); Matthias Hofmann, Schweinfurt (DE); Baozhu Liang, Dittelbrunn-Hambach (DE); Hans-Juergen Liesegang, Schortens (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/250,391

(22) Filed: Aug. 29, 2016

(65) Prior Publication Data

US 2017/0059448 A1   Mar. 2, 2017

(30) Foreign Application Priority Data

Aug. 28, 2015 (DE) .......................... 10 2015 216 472

(51) Int. Cl.
| | |
|---|---|
| *F16C 41/00* | (2006.01) |
| *G01M 13/04* | (2006.01) |
| *F16C 19/52* | (2006.01) |
| *F16C 33/34* | (2006.01) |
| *F16C 33/52* | (2006.01) |

(52) U.S. Cl.
CPC ............. *G01M 13/04* (2013.01); *F16C 19/52* (2013.01); *F16C 33/34* (2013.01); *F16C 33/523* (2013.01); *F16C 41/00* (2013.01); *F16C 41/008* (2013.01); *F16C 2233/00* (2013.01)

(58) Field of Classification Search
CPC ........................... F16C 33/523; F16C 41/008
See application file for complete search history.

(56) References Cited

U.S. PATENT DOCUMENTS

| 9,512,882 B2 * | 12/2016 | Wei .......................... F16C 19/28 |
| 2015/0260229 A1 * | 9/2015 | Adane ................... F16C 41/008 384/448 |

FOREIGN PATENT DOCUMENTS

| DE | 102004049968 A1 | 4/2006 |
| DE | 102010023013 A1 | 12/2011 |

(Continued)

OTHER PUBLICATIONS

Machine translation of JP2013-250204, no date.*

*Primary Examiner* — Thomas R. Hannon
(74) *Attorney, Agent, or Firm* — Bryan Peckjian; SKF USA Inc. Patent Dept.

(57) ABSTRACT

A bearing arrangement having an inner race and an outer race, between which rolling elements are disposed, the rolling elements being accommodated in a bearing cage. At least one rolling element is designed as a sensor rolling element, and the bearing cage is designed as a pin cage having multiple pin elements that at least partially accommodate the rolling elements and the at least one sensor rolling element, and a sensor rolling element for a bearing arrangement of this kind are disclosed.

11 Claims, 3 Drawing Sheets

(56) References Cited

FOREIGN PATENT DOCUMENTS

| | | |
|---|---|---|
| DE | 102010038393 A1 | 1/2012 |
| DE | 102011075495 A1 | 2/2012 |
| DE | 102010035185 A1 | 3/2012 |
| DE | 102012200779 A1 | 7/2013 |
| DE | 102012202522 A1 | 8/2013 |
| DE | 102014204537 B3 | 6/2015 |
| EP | 0908714 A1 | 4/1999 |
| EP | 2354578 A2 | 8/2011 |
| EP | 2746610 A1 | 6/2014 |
| JP | 2011106580 A | 6/2011 |
| JP | 2013250204 A | 12/2013 |
| WO | 2012069066 A1 | 5/2012 |
| WO | 2015032445 A1 | 3/2015 |
| WO | 2015032449 A | 3/2015 |
| WO | 2015032449 A1 | 3/2015 |

\* cited by examiner

BEARING ARRANGEMENT HAVING A SENSOR ROLLING ELEMENT

CROSS REFERENCE TO RELATED APPLICATIONS

This application claims priority to German patent application no. 102015216472.1 filed on Aug. 28, 2015, the contents of which are fully incorporated herein by reference.

FIELD OF THE INVENTION

The present invention relates to a bearing arrangement having an Inner race and an outer race, between which rolling elements are disposed, the rolling elements being accommodated in a bearing cage, wherein at least one rolling element is designed as a sensor rolling element, and having a sensor rolling element for a bearing arrangement of this type.

BACKGROUND OF THE INVENTION

It is known from the prior art to equip roller bearings with sensors in order to measure the forces, for example, rotational speed, or temperatures acting upon the roller bearing. In this case, the sensors are disposed in a rolling element, for example, wherein the sensors can also provide antennas for transmitting the measured data to an external receiver.

BRIEF SUMMARY OF THE INVENTION

The disadvantage of the bearing arrangements having a sensor rolling element known from the prior art, however, is that maintenance of the sensor rolling element is very complicated and, therefore, very costly. In order to gain access to the sensor rolling element, the entire roller bearing typically must be disassembled.

The problem addressed by the present invention is therefore that of providing a bearing arrangement which allows for simplified and improved maintenance of a sensor rolling element.

This problem is solved by a bearing arrangement according to claim 1, and by a sensor rolling element for a bearing arrangement of this type, according to claim 11.

A bearing arrangement having an inner race and an outer race is presented in the following, between which rolling elements are disposed, the rolling elements being accommodated in a bearing cage. In this case, at least one rolling element is designed as a sensor rolling element. With the aid of the sensor rolling element, the influencing factors acting upon the bearing, such as, for example, rotational speeds, pressures or temperatures can be measured and transmitted to an external receiver for data evaluation.

In order to achieve improved maintenance of the sensor rolling element, it is provided that a pin cage is utilized instead of the pocket cage known from the prior art. A bearing cage of this type provides multiple pin elements which at least partially accommodate the rolling elements and the at least one sensor rolling element. Due to the pin cage, it is possible to directly access the sensor rolling element as needed, without the need to entirely disassemble the roller bearing. The rolling elements typically have an axial, central through-hole for accommodating the pin elements. Since at least one sensor module, which is extensively described in the following, is disposed in the sensor rolling element, however, the pin element cannot be easily accommodated in the sensor rolling element via the central through-hole known from the prior art. Therefore, a further aspect of the present invention relates to preferred embodiments of the pin element and/or of the sensor module.

According to one preferred embodiment, the sensor rolling element is therefore designed as a sleeve having a sleeve interior. In this case, at least one sensor module for detecting at least one bearing variable, such as, for example, temperature, vibration, strain, etc., is accommodated in the sleeve interior.

In order to accommodate the at least one sensor module in the sensor rolling element, it is provided according to a further preferred exemplary embodiment that the pin element can be designed as two mutually spaced holding elements in an area in which the rolling element is accommodated. In this case, the holding elements engage into correspondingly designed recesses in the sensor rolling element. Advantageously, the holding elements are designed in such a way that, in the case of a sensor rolling element having a sleeve, the holding elements engage directly into the sleeve and extend, in a portion, along an axis of rotation of the sensor rolling element, and so, mutually spaced, they form a space between themselves, in which the at least one sensor module can be accommodated. In this case, at least one holding element can also be integrally formed with a side element of the bearing cage. Alternatively, at least one holding element can also be formed as a separate element, of course.

In a further preferred exemplary embodiment, the pin element is designed as a continuous pin for the sensor rolling element. The continuous pin provides the advantage that the sensor rolling element, as well as the other rolling elements, can be easily inserted onto the pin during assembly, without the need for any other fastenings. As a result, the roller bearing can be easily produced. In order to fixedly connect the pin element with at least one side element of the bearing cage, the pin element of the sensor rolling element, as well as the pin elements of the remaining rolling elements, can be connected to the bearing cage by means of at least one fastening element. In order to also provide sufficient space for accommodating at least one sensor module in the sensor rolling element in the case of a continuous pin, the pin is designed in the shape of a dumbbell and, in one portion, has a reduced diameter in the sleeve interior.

According to a further exemplary embodiment, the sensor module itself can be accommodated in the sleeve, centered with respect to an axis of rotation of the sensor rolling element. Advantageously, the sensor module extends radially across the entire interior.

Alternatively or additionally, the at least one sensor module can be accommodated in the sleeve interior circumferentially and radially spaced from an axis of rotation of the sensor rolling element. As a result, a continuous pin element, in particular, can be utilized for fastening the sensor rolling element on the bearing cage.

In addition, multiple sensor modules can also be accommodated in the sleeve circumferentially and radially spaced from the axis of rotation of the sensor rolling element, wherein the sensor modules preferably measure different bearing parameters. Moreover, it is also possible to design the sensor module having an annular shape. The sensor module(s) can be detachably or non-detachably fastened on an inner surface of the sleeve by means of an integral and/or a form-locked and/or a force-locked connection, and so the entire system or even only one of the sensor modules can be easily replaced as necessary.

According to a further exemplary embodiment, the bearing arrangement provides at least one current-providing element and/or at least one, preferably wireless, data transmission element, for example, an antenna, and/or at least one amplifier. In this case, the at least one current-providing element and/or the at least one data transmission element are/is preferably disposed on the at least one sensor module or is integral with the sensor module, whereas the amplifier is preferably disposed on the bearing cage and/or on one of the bearing races.

With the aid of the preferably wireless data transmission element, the measurement data can be transmitted wirelessly, for example as electromagnetic waves, to a receiver, in particular to an evaluation station. In this case, the receiver is preferably located outside the roller bearing. A through-opening can be provided in the bearing cage, for example, in one of the holding elements, in order to allow for a trouble-free transmission of the signals to the receiver.

In the case of large bearings, an amplifier can be provided, which can be accommodated on the sensor rolling element and/or on the bearing cage and/or on at least one of the bearing races, in order to transmit the measurement data from an area inside the bearing or to communicate with measurement stations, located far away. As a result, it is possible to arrange a lower-energy data transmission element on the sensor rolling element, for which less energy needs to be provided.

According to a further preferred exemplary embodiment, the current-providing element is designed as a battery. Additionally or alternatively, the current-providing element can also be designed as an inductively operated generator, which provides the advantage that current is generated via the rotary motion inherent to the bearing. Therefore, energy can be provided to the sensor module throughout the entire service life of the roller bearing.

In this case, the inductively operated generator provides a rotor, which has at least one coil, and a stator, which has at least one magnet, wherein the stator is preferably connected to the bearing cage or to one of the bearing races, and the rotor is preferably connected to the sensor rolling element. A current can therefore be generated via the rotary motion of the sensor rolling element relative to the bearing cage or the bearing race, which current can be provided in the sensor module via the coil of the rotor. In this case, it is preferable for the at least one coil and the at least one magnet to be oriented closely to one another, in order to provide for particularly effective current generation.

According to a further preferred exemplary embodiment, the bearing cage provides at least one first and one second bearing cage segment. In this case, the two bearing cage segments can be connected to one another and/or disconnected from one another by means of an integral and/or a form-locked and/or a force-locked connection, or they can not be connected to one another. If the bearing cage segments are connected to one another, they can absorb greater loads, for example, since they function as a fixed unit. If the cage segments are not connected, however, they are, inter alia, more easily removed and/or replaced. The segmenting of the bearing cage provides the advantage that smaller individual parts can be produced and the assembly of both the bearing cage and the roller bearing is simplified. At the same time, the maintenance of the sensor rolling element is simplified, since it is only necessary to access the bearing cage segment having the sensor rolling element, as needed. Preferably one sensor rolling element is provided for each bearing cage segment. It is also possible, however, to arrange several or no sensor rolling elements on the bearing cage segment.

A further aspect of the invention relates to a sensor rolling element for a bearing arrangement having a pin cage which has at least one of the above-described features.

Further advantages and advantageous embodiments are described in the dependent claims, the description, and the drawings. In this case, a combination of the features in the description and in the drawings is presented merely by way of example, and it is clear to a person skilled in the art that the features do not necessarily have to be present in the indicated combination. Instead, the features can also be present individually or in different combinations with one another without going beyond the scope of the invention.

The principle of the invention is described in greater detail in the following with reference to exemplary embodiments depicted in the drawings. The exemplary embodiments are merely examples and are not intended to establish the scope of the invention. This applies, in particular, for features depicted in combination, which can also be implemented as standalone features within the scope of the present invention. The scope of protection of the application is defined solely via the dependent claims.

DETAILED DESCRIPTION OF THE INVENTION

Identical or identically functioning elements are labeled with the same reference numbers in the following.

Figure 1:
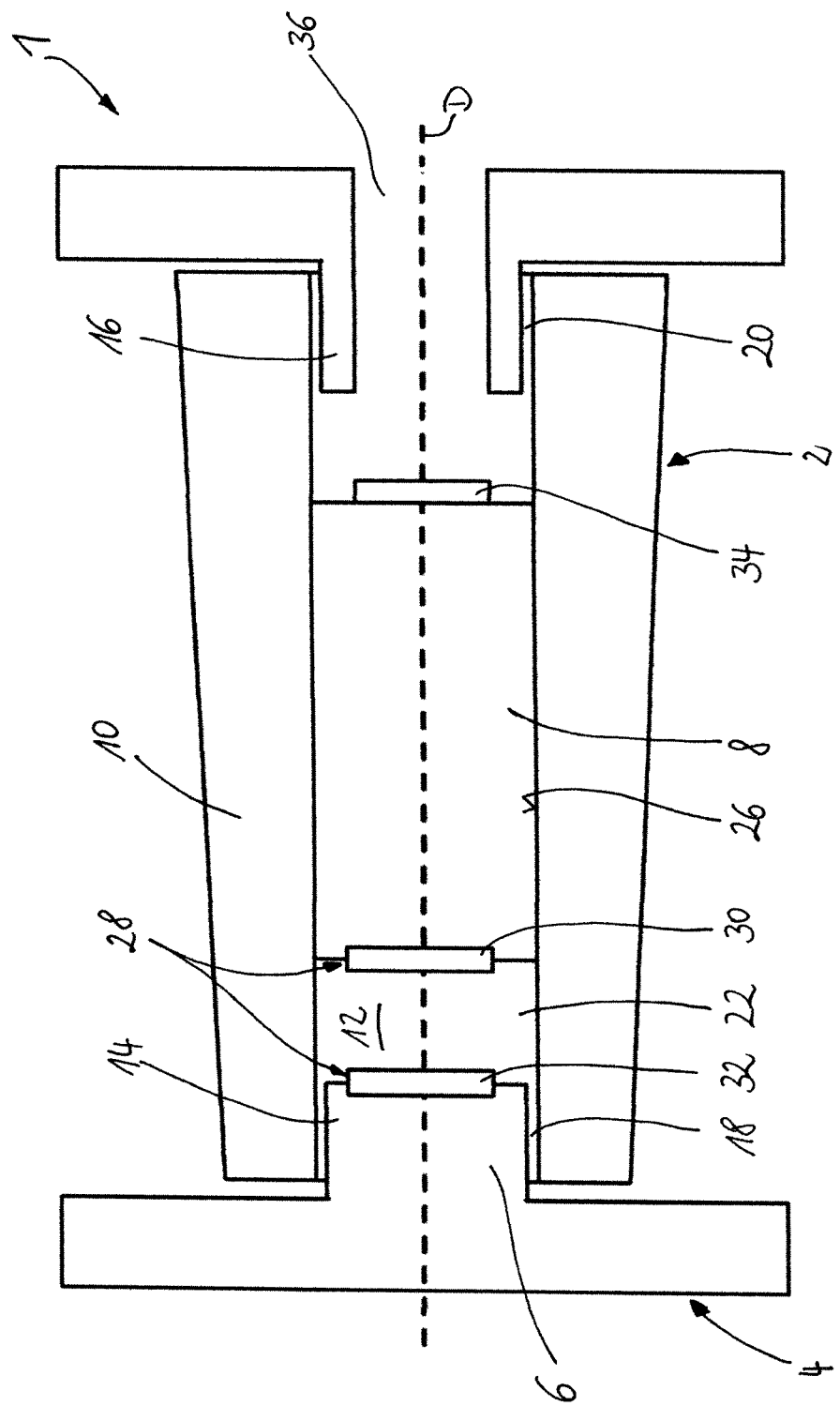
FIG. 1 shows a schematic illustration of a longitudinal cross-section of a first exemplary embodiment of the bearing arrangement according to the invention.
Figure 2:
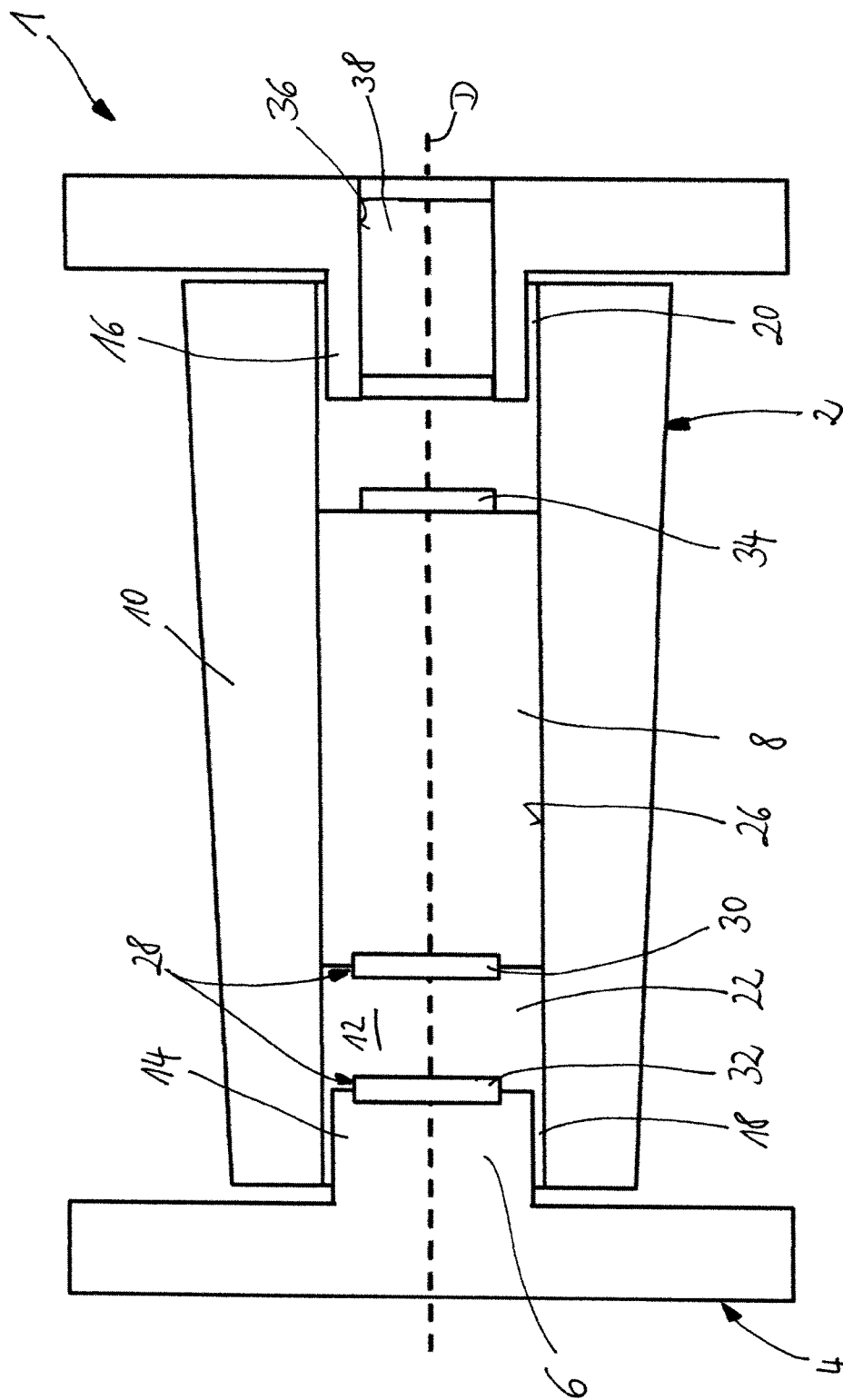
FIG. 2 shows a schematic illustration of a longitudinal cross-section of a second exemplary embodiment of the bearing arrangement according to the invention.
Figure 3:
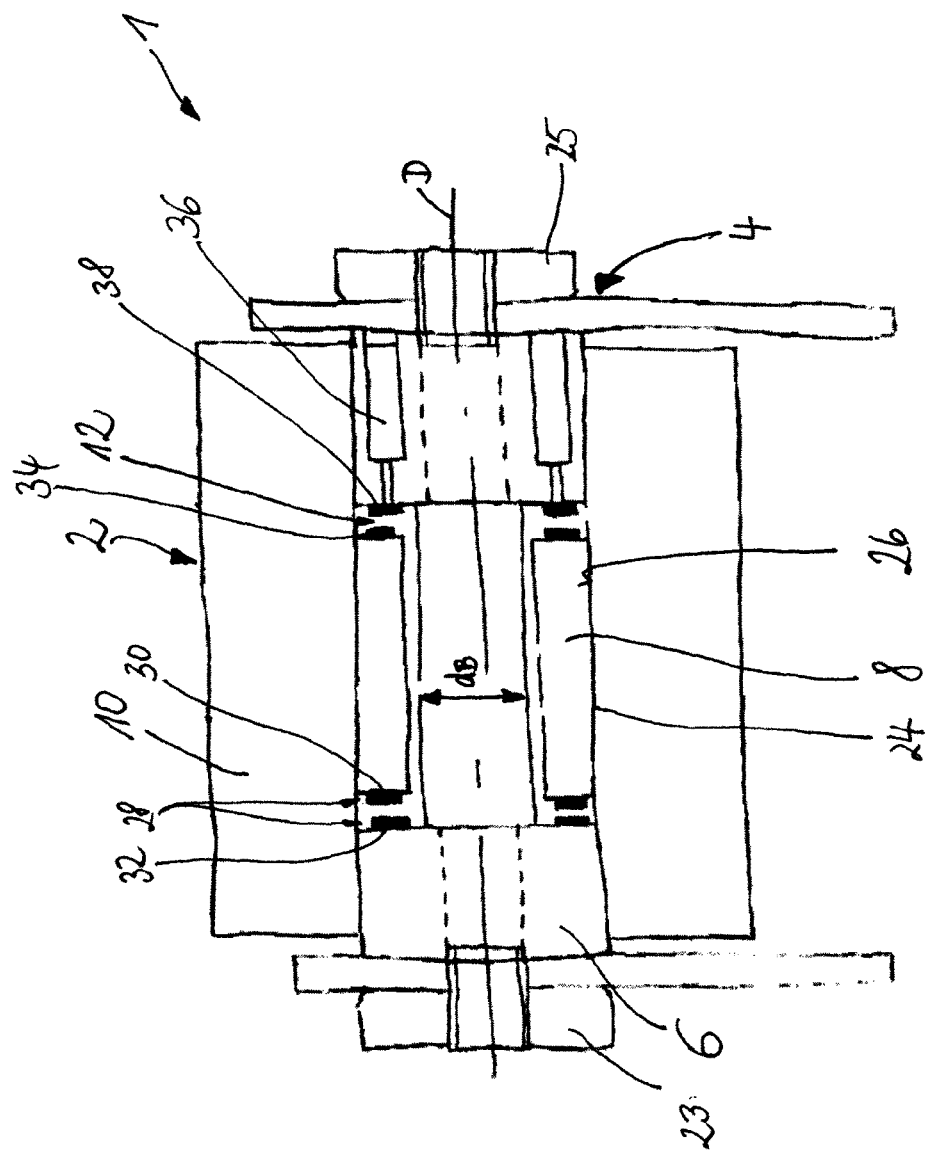
FIG. 3 shows a schematic illustration of a longitudinal cross-section of a third exemplary embodiment of the bearing arrangement according to the invention.

FIGS. 1 to 3 each show a schematic illustration of a longitudinal cross-section of a bearing arrangement 1 of a roller bearing having a sensor rolling element 2 which is accommodated in a bearing cage 4. The bearing cage 4 is disposed between a bearing inner race and a bearing outer race (not shown), as usual, and is designed for separating and guiding the rolling elements. In this case, the forces acting on the roller bearing, such as, for example, rotational speeds, temperatures, or pressures can be measured and transmitted to an external receiver (not shown) with the aid of the sensor rolling element 2.

FIGS. 1 to 3 also show that the bearing cage 4 is designed as a pin cage and provides pin elements which are accommodated in a central hole formed in the rolling elements. A conventional pin element cannot be utilized, however, since the sensor rolling element 2 provides at least one sensor module 8 which is designed for detecting the at least one bearing variable. In order to nevertheless utilize the advantage of a pin cage, the pin cage provides a pin element 6 in the area of the sensor rolling element 2, which pin element is designed especially for holding the sensor rolling element 2. FIGS. 1 and 2 show a first embodiment, whereas FIG. 3 shows a second possible embodiment of the pin element 6 and the sensor rolling element 2. In both embodiments, however, the sensor rolling element 2 provides a sleeve 10 having a sleeve interior 12, wherein the sleeve interior 12 is designed for accommodating at least one sensor module 8 which is fastened on an inner surface 26 of the sleeve 10.

In the special embodiment according to FIGS. 1 and 2, the pin element 6 is designed as two mutually spaced holding elements 14, 16. In this case, the holding elements 14, 16 engage into the sleeve interior 12 of the sensor rolling element 2. The two holding elements 14, 16 extend into a portion 18, 20 along an axis of rotation D of the sensor rolling element 2. However, they are mutually spaced in such a way that they form a space 22 between themselves for accommodating the sensor module 8. The holding elements 14, 16 themselves are integral with the bearing cage 4, although they can also be designed as elements to be attached separately.

Alternatively, as shown in FIG. 3, the pin element 6 can also be designed as a continuous pin, which has a reduced diameter $d_B$ in a portion 24. In addition, fastening elements 23, 25 are provided for fixing the pin element 6, via which fastening elements the pin element 6 is connected to the bearing cage 4. A design which is at least partially integral with the bearing cage 4 is also possible here, of course.

In turn, the sensor module 8 can extend across the entire sleeve interior 12, centered with respect to the axis of rotation D, as depicted in FIGS. 1 and 2. Alternatively or additionally, it is also possible to arrange the sensor module 8 circumferentially and radially spaced from an axis of rotation D of the sensor rolling element 2, as shown in FIG. 3. In this case, multiple sensor modules 8 can also be arranged circumferentially in the sleeve 10. Alternatively, it is also possible to design the sensor module 8 having an annular shape.

As is also shown in FIGS. 1 to 3, at least one current-providing element 28 in the form of a generator having a rotor 30, which provides a coil, and a stator 32, which provides a magnet, is formed on the sensor rolling element 2. In this case, as shown in FIGS. 1 to 3, the rotor 30 is connected to the sensor rolling element 2, whereas the stator 32 is connected to the bearing cage 4. Therefore, a current can be generated as a result of a rotary motion of the sensor rolling element 2 relative to the bearing cage 4, which current is provided in the sensor module 8 via the coil of the rotor 30. In this case, the rotor 30 and the stator 32, as shown in FIGS. 1 to 3, are situated close to one another, in order to provide for particularly effective current generation.

It is also clear from FIGS. 1 to 3 that a preferably wireless data transmission element 34, for example, an antenna, is disposed on the sensor rolling element 2, which antenna wirelessly transmits electromagnetic waves, in particular radio waves, to an external receiver (not shown). In order to effectively transmit the signal to the receiver, a through-hole 36 is provided in one of the holding elements 14, 16, preferably the holding element 16 situated opposite the data transmission element 34, as shown in FIG. 1; the through-hole makes a trouble-free transmission of the signals out of the bearing interior possible.

If large distances must be covered, or if a low-powered data transmission element 34 will be used, an amplifier 38 can also be used, which is disposed in the through-hole 36, for example, as shown in FIG. 2.

In summary, with the aid of the bearing arrangement according to the invention and with the aid of the associated sensor rolling element, a roller bearing can be provided, in the case of which the sensor rolling element can be easily replaced. In this case, the rolling elements and the at least one sensor rolling element are accommodated in one, preferably segmented, pin cage which makes it possible to easily access and replace the sensor rolling element(s). In order to accommodate a pin element in the sensor rolling element, the pin element can be shaped like a dumbbell, for example, or can provide two separate holding elements, which are not connected to one another and provide a space between them for accommodating at least one sensor module.

LIST OF REFERENCE NUMBERS 1 bearing arrangement
2 sensor rolling element
4 bearing cage
6 pin element
8 sensor module
10 sleeve
12 sleeve interior
14, 16 holding element
18, 20 portion
22 space
24 portion
23, 25 fastening element
26 inner surface
28 current-providing element
30 rotor
32 stator
34 data transmission element
36 through-hole
38 amplifier
D rotational axis
$d_B$ small pin diameter

The invention claimed is:

1. A bearing arrangement comprising:
an inner race;
an outer race;
rolling elements disposed between the inner race and the outer race, the rolling elements being accommodated in a bearing cage,
wherein at least one rolling element is designed as a sensor rolling element, the sensor roller element comprising a sensor module disposed within an interior of a tubular sleeve; and
a sensor data providing device disposed within the interior of the tubular sleeve, the sensor data providing device is provided in signal communication with the sensor module,
wherein the bearing cage is configured as a pin cage having multiple pin elements, wherein the pin elements engage with the sleeve interior at each respective end of (a) each of the the rolling elements and (b) the hollowed portion at each respective end of the sleeve of the at least one sensor rolling element.

2. The bearing arrangement according to claim 1, wherein the bearing cage further comprises at least one first bearing cage segment and one second bearing cage segment.

3. The bearing arrangement according to claim 1, wherein the pin element is configured as two mutually spaced holding elements in an area in which the sensor rolling element is accommodated, wherein the holding elements engage into correspondingly designed recesses in the sensor rolling element.

4. The bearing arrangement according to claim 1, wherein the pin element is designed as a continuous pin for a sensor rolling element.

5. The bearing arrangement according to claim 1, wherein the sensor rolling element is configured as a sleeve having a sleeve interior, in which at least one sensor module for detecting at least one bearing variable is accommodated.

6. The bearing arrangement according to claim 5, wherein the at least one sensor module is accommodated in the sleeve, centered with respect to an axis of rotation (D) of the sensor rolling element.

7. The bearing arrangement according to claim 5, wherein the at least one sensor module is accommodated in the sleeve interior circumferentially and radially spaced from an axis of rotation (D) of the sensor rolling element.

8. The bearing arrangement according to claim 1, wherein the bearing arrangement further comprises at least one current-providing element and/or at least one data transmission element and/or at least one amplifier, and wherein the at least one current-providing element and/or the at least one data transmission element are/is disposed on the sensor module.

9. The bearing arrangement according to claim 8, wherein the current-providing element is configured as an inductively operating generator and/or as a battery.

10. The bearing arrangement according to claim 9, wherein the inductively operated generator further comprises at least one rotor, which has at least one coil, and a stator, which has at least one magnet, and wherein the stator is disposed on the bearing cage and the rotor is disposed on the sensor rolling element.

11. A bearing arrangement comprising:
an inner race;
an outer race; and
rolling elements disposed between the inner race and the outer race, the rolling elements being accommodated in a bearing cage;
wherein at least one rolling element is designed as a sensor rolling element,
wherein the bearing cage is configured as a pin cage having multiple pin elements that at least partially accommodate the rolling elements and the at least one sensor rolling element,
wherein the pin element is designed as a continuous pin for a sensor rolling element.

* * * * *